United States Patent [19]

Marelli

[11] Patent Number: 4,492,338

[45] Date of Patent: Jan. 8, 1985

[54] ULTRASONIC APPARATUS, PARTICULARLY FOR LIQUID PROCESSING

[75] Inventor: Ernesto Marelli, Monza, Italy

[73] Assignee: Ottorino Sparano, Cernobbio, Italy

[21] Appl. No.: 349,237

[22] Filed: Feb. 16, 1982

[30] Foreign Application Priority Data

Feb. 26, 1981 [IT] Italy ................................ 20006 A/81

[51] Int. Cl.³ ................................................ B05B 1/08
[52] U.S. Cl. ..................................... 239/102; 239/124
[58] Field of Search .................... 239/4, 102, 124, 127; 310/311, 321, 365, 366; 431/1; 60/247, 39.76, 39.77

[56] References Cited

FOREIGN PATENT DOCUMENTS 47-37088  9/1972  Japan ........................................ 431/1

*Primary Examiner*—Andres Kashnikow
*Attorney, Agent, or Firm*—Guido Modiano; Albert Josif

[57] ABSTRACT

The apparatus comprises a periodic wave generating unit driving at least a piezoelectric transducer for generating ultrasounds, which latter includes a base block associated with a passage conduit and wherewith there are associated a plurality of piezoelectric buttons or pads interposed between different polarity electric contacts electrically coupled to the generating unit and clamped against the base block by means of a counterblock.

4 Claims, 4 Drawing Figures

ULTRASONIC APPARATUS, PARTICULARLY FOR LIQUID PROCESSING

BACKGROUND OF THE INVENTION

This invention relates to an ultrasonic apparatus, particularly for liquid processing.

It is a known fact that in many industrial fields ultrasonic apparatus are currently utilized for the treatment of liquids, such as for emulsifying fuels, formation of emulsions, ageing of wines, water purification, and other applications. Currently known ultrasonic apparatus generally comprise an electric generator which is operative to transmit periodic waves to a transducer formed as a single piezoelectric disk which acts on a chamber wherein the liquid to be treated is collected.

This system, which may be defined a single chamber system, has failed so far to provide fully satisfactory results, because in actual practice it is unsuitable for use in large scale industrial applications, and because it cannot provide a good output level.

Another disadvantage of such prior systems is that the applicable specific power is extremely small, which results in a less than significant effectiveness of the treatment process, while the systems themselves are scarcely versatile and cannot promptly meet changing operating condition requirements.

SUMMARY OF THE INVENTION

It is a primary object of this invention to obviate such prior shortcomings by providing an ultrasonic apparatus, which by virtue of its particular structural features, can afford high homogenizing levels.

It is a further object of the invention to provide an ultrasonic apparatus which enables a continuous treatment of liquids, while affording the possibility of convenient application on an industrial scale.

Another object of this invention is to provide an apparatus which enables a process requiring no special precautions as regards the proportioning of the input liquids, while achieving an instantaneous homogenization of the product and atomization thereof, on account of the possibility it affords of using, in the instance of fuel processing, liquid fuels of very high density.

Yet another object of the invention is to provide such an apparatus, which allows waterfuel emulsions to be obtained using ordinary tap water, for either domestic or industrial use, and which can afford stable emulsions even with water in percentages exceeding 60%.

Yet another object of this invention is to provide an extremely versatile apparatus, which can allow application in quite different fields with unfailingly satisfactory results. Thus, for example, the apparatus may be used to emulsify different liquids, to process liquid fuels, liquid fuel on ships burning heavy grade oil, to atomize different liquids by drawing, extract flavors, extract dyes, for bactericide treatments, for dispersing pigments, to decontaminate radioactive residues, recover by fractioning suspended particulate having a different specific gravity from the suspension liquid, to age wines, purify water, for treating wires, sheets and mouldings continuously, in the construction of very high power systems for cleansing workpieces or parts of intricate geometry, for decontamination and sterilization purposes with liquid body recycling and filtering features, as well as in innumerable other applications.

Yet another object of this invention is to provide an apparatus which can be implemented from greatly simplified elements from the technological standpoint, is easily manufactured on a commercial basis at very low costs.

These and other objects, such as will be apparent hereinafter, are achieved by an ultrasonic apparatus, particularly for liquid processing, which comprises a periodic wave generating unit driving at least one piezoelectric transducer to generate ultrasounds provided for acting on a product to be treated, characterized in that said at least one transducer comprises a base block associated with a passage conduit length for the product being treated, with said base block there being associated a plurality of piezoelectric pads or buttons intercalated between electric contacts with different polarities electrically connected to said generating unit and being clamped against said base block by means of a counterblock.

BRIEF DESCRIPTION OF THE DRAWINGS

Further features and advantages will be more clearly understood from the following detailed description of a preferred, but not limitative, embodiment of an ultrasonic apparatus for liquid processing according to the invention, with reference to the accompanying illustrative drawings, where.

DESCRIPTION OF THE PREFERRED EMBODIMENTS

Figure 1:
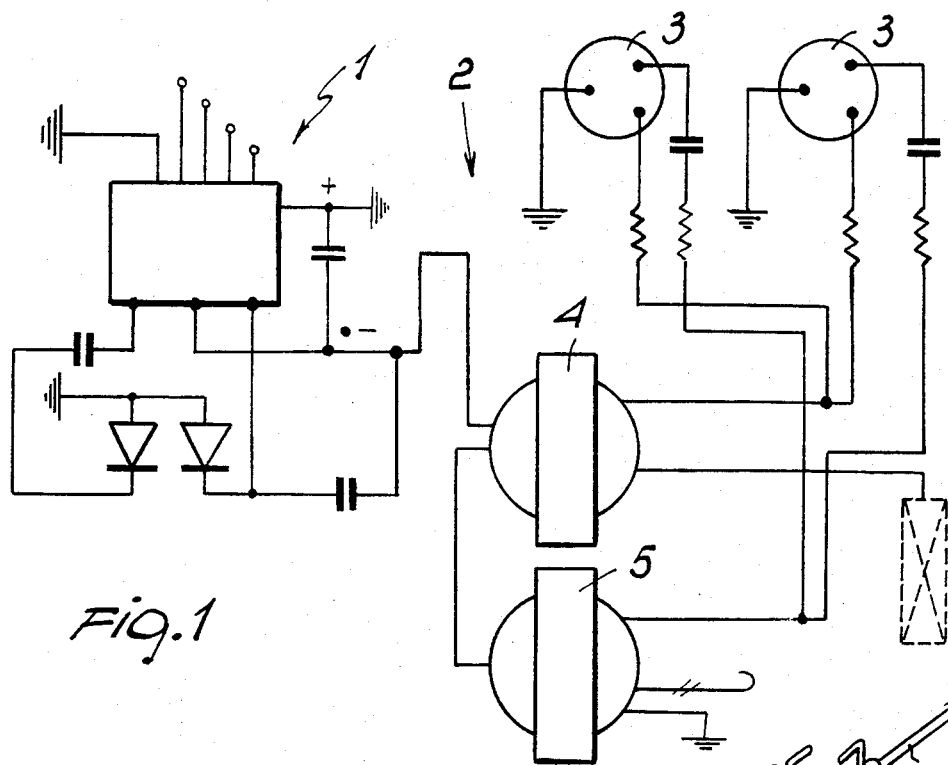
FIG. 1 is a block diagram of the periodic wave generating unit.

With reference to the drawing figures, the ultrasonic apparatus, particularly for liquid processing, according to the invention, comprises a periodic wave generating unit which is fully transistorized and self-tuning, and has circuits cooled by forced ventilation; said generating unit includes a rectifier, generally indicated at 1, which is equipped with a supply transformer having a plurality of inputs for different supply voltages. The rectifier 1 is connected to an oscillator, generally indicated at 2, which incorporates a pair of transistors, indicated at 3, having their collectors in common and their respective emitters connected to a first power transformer 4, their bases being connected to a second power transformer 5; the power transformers 4 and 5 are oppositely connected to each other in a push-pull relationship, thereby they can produce an algebraic sum of currents, with attendant automatic adjustment of the load impedance.

The cited generating unit, which creates a train of periodic waves, drives at least one piezoelectric transducer to generate ultrasoundsacting on a product being treated, which is generally designated with the reference numeral 10.

Figures 2, 3:
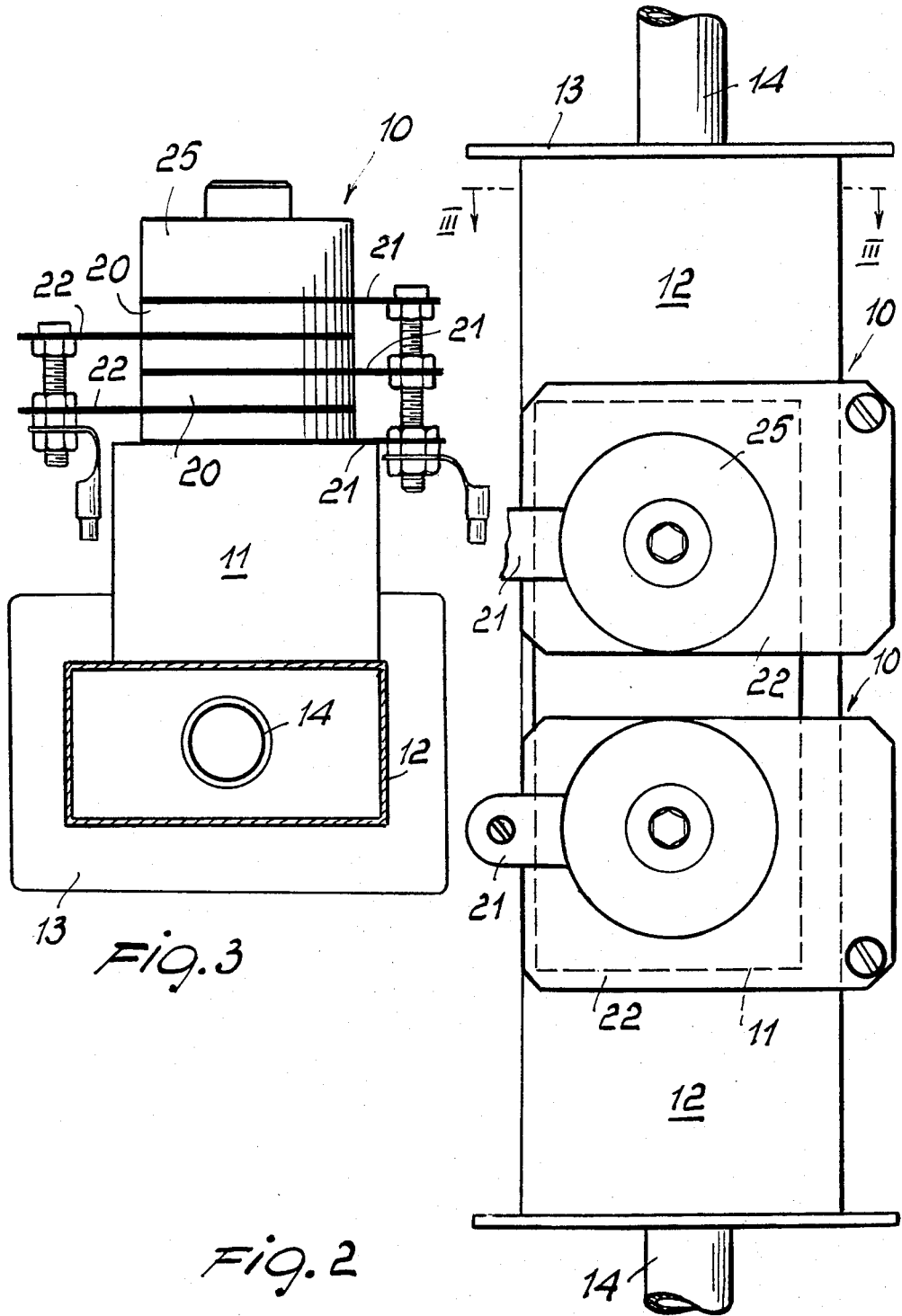
FIG. 2 illustrates one embodiment of the transducer, shown in top plan view.
FIG. 3 is a sectional view taken along the line III—III of FIG. 2.

The piezoelectric transducer 10, which is more clearly shown in FIGS. 2 and 3, includes a base block 11, which constitutes in practice the mechanical amplifier of the transducer and is associated with an enclosure member intervening on the passage conduit for the product being treated. More specifically, the enclosure member has a body 12 of substantially parallelepipedal configuration and having a preferably rectangular or at least polygonal cross-section, which body is provided, at its axial ends, with flanges 13 having fittings 14 for connection to the passage conduit for the product to be treated. Where high pressure liquids are to be processed, the enclosure member, or cavitation chamber, would be formed directly in the base block, the dimensions whereof are a function of the specific power and wave length.

The base block is formed from an 11 UNI 3571 TA 16 alloy comprising: 0.03 Cu, 0.41 Fe, 1.02 Si, 0.75 Mg, 0.50 Mu, 0.01 Zm, 0.02 Ti, 0.01 Cr, the rest being Ni/Al.

Said base block provides support for a plurality of piezoelectric pads or buttons, indicated at 20, which are preferably of the PZT 4 type and are intercalated between the contacts electrically connected to the cited generating unit.

More in detail, and as shown best in FIG. 3, four such piezoelectric pads or buttons are provided, with three negative contacts and two positive contacts arranged on the opposite faces of the piezoelectric buttons. The negative contacts are arranged such as to be connected to the base block 12 as well as to the counter-block 25 located above the button set and acting as a clamping element, through the utilization of a throughgoing bolt.

The negative contacts 21 are formed from a copper-beryllium alloy, and the two positive contacts indicated at 22 are made of a brass alloy.

The assembling is in practice performed as a four-layer sandwich arrangement, with electric contacts of the mechanical weld-less type.

The particular construction adopted affords the achievement of a very high specific power for each transducer, and enables the use of plural transducers, preferably arranged side-by-side or, alternatively, juxtaposed to one another.

According to some preferred, but not limitative, embodiments, the apparatus of this invention may be mounted in an ultrasound group which includes, in practice, and in addition to the transducer application described hereinabove, the incorporation of a similar transducer acting as a pre-atomizer with final atomizer functions.

Figure 4:
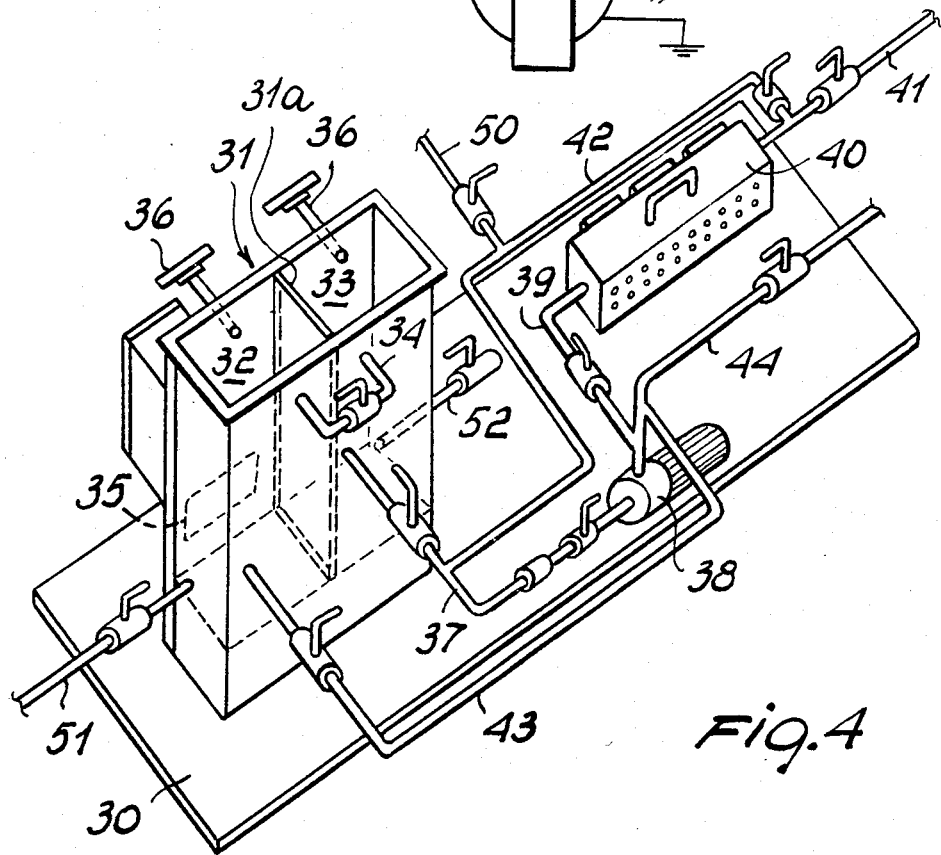
FIG. 4 diagramatically illustrates one possible hydraulic connection circuit of the apparatus according to the invention.

According to one embodiment of the assembly, illustrated in FIG. 4, a base platform 30 is provided, whereon is mounted a pre-atomizer 31 which comprises a casing the interior whereof is divided by a partition 31a and closed tight at the top by a welded cover on which a safety valve may be arranged. The casing or container 31 is divided into two chambers 32 and 33 which communicate to each other through a bridge connection 34 controlled by a valving means. Within each chamber, there may be operative a transducer group of a similar type to the one described hereinabove, and there may be provided a pre-heater, indicated at 35. Into the chambers there can be introduced, either in a pre-mixed or separate conditions, e.g. a fuel and water, inlet fittings, indicated at 36, being provided for this purpose.

In communication with one of said chambers, is a suction line or conduit 37 of a pumping element 38, the delivery line 39 whereof is led into a transducer of the same type as described above, where in practice the final atomization of the product being treated takes place. The cited transducer constituting the final atomizer is contained within a ventilation housing 40, wherefrom a service delivery line 41 is led out.

From the line or conduit 41, there extends a recirculation conduit 42, which leads back to the suction conduit 37, thus affording an additional atomization of the product where required.

From the outlet end of the pumping element 38, there extend a recirculation conduit for the pre-atomizate, as indicated at 43, which is led back into the first chamber 32, and a pre-atomizate pickup conduit 44.

The circuit is then completed with an inlet 50 for drawing the atomized product from the outside, and exhaust conduits 51 and 52 of the chambers 32 and 33.

The assembly just described, and wherein all of the conduits would be controlled by valving means, allows the effectuation of a treatment on the fluid product which is a direct function of the user's requirements, as well as of the individual condition of the product being treated.

Moreover, an important aspect is that the liquid product is subjected, in sequential steps, to an ultrasonic treatment process of high specific power, which enables a perfect and complete homogenization at molecular level of the product involved.

Actual tests carried out have shown that with the above assembly it becomes possible to achieve a complete homogenization of fuel, whereby by adding water up to 40-60 percent, a stable emulsion is produced, which in turn allows the liquid body to become vaporized and combustible to release heat in greater amounts than would the straight liquid fuel employed as the process input material.

In practice, it occurs that during the final combustion step the nitrogen oxides are reduced, the dissipation of heat particles is decreased, suspended particulate is almost entirely removed from the fumes, the air requirements for normal combustion are reduced, and the efficiency of the heat generators is improved.

The inventive apparatus produces no corrosion and/or alteration effects, either on itself or on its environment, even though the water present in the emulsion during the combustion obviously undergoes an evaporation process.

The reason why corrosion problems have been eliminated, from the piping and the system, or from the combustion chamber, after the combustion has been completed, is to be attributed to the fact that the stoichiometric conditions of one kilogram fuel result in a limited increase of the water present in the combustion process.

Also as regards problems of overpressure within the combustion chamber, or problems arising from a volume increase of the combustion products, it can be said that no problems of any kind are encountered.

Thus, the invention distinguishes itself by that it enables the liquid to be treated while flowing, and can be operated continuously without producing beat.

Furthermore, there is created in practice in the feed conduit a cavitation chamber of high specific power, whereon the transducer described hereinabove is mounted, with the advantage of providing an instantaneous homogenization of the product and atomization thereof, and with the possibility of utilizing liquid fuels of very high density, which are recognized to be difficult to use and less valuable.

It should be further added to the foregoing that with this system it becomes possible to use generating units with power on the order of one kilowatt and capable of generating frequencies in the range from 25 KHz to 10 MHz, depending on individual requirements.

Moreover, it is to be noted that where a pre-atomizing group is utilized, as described hereinabove, the use of two separate generating units becomes advisable.

Also, the apparatus may be supplied with either rectified current or direct current at 12 Volts.

Therefore, it will be appreciated from the foregoing description that the invention achieves its objects, and in particular that the provisions made, such as the particular structure of the transducer, allow the obtainment of definitely superior results to those afforded by prior apparata, in that a considerably higher specific power is made available than with prior apparatus, with the advantage that a more effective and complete treatment of a liquid can be ensured.

Furthermore, in the event that still higher power levels are required, it will be possible to use plural transducers, similar to the one described above, arranged in sequential sets.

The invention as herein conceived is susceptible to many modifications and variations without departing from the scope of the instant inventive concept.

Moreover, all of the details may be replaced with other technically equivalent elements.

I claim:

1. An ultrasonic assembly for the ultrasonic treatment of liquids comprising a pre-atomizer having a casing and a partition wall in the casing defining two chambers, a bridge conduit having a first end connected to a first of said chambers and another end connected to a second of said chambers, a final atomizer located downstream of said pre-atomizer and having an outlet end, piezoelectric transducers mounted on said pre-atomizer and said final atomizer, a pumping element having a suction conduit and a delivery conduit, said suction conduit of said pumping element being connected to one of said chambers, and said delivery conduit of said pumping element being connected to said final atomizer, and a recirculation conduit having a first end connected to said outlet end of said final atomizer and a second end connected to said suction conduit of said pumping element.

2. An assembly according to claim 1, comprising a pre-atomizate recirculation conduit having a first end connected to said delivery conduit of said pumping element and a second end connected with one of said chambers.

3. An assembly according to claim 1, wherein valving means are arranged in said bridge conduit, suction conduit, delivery conduit and recirculation conduit.

4. An assembly according to claim 2, comprising valving means arranged in said pre-atomizate recirculation conduit.

* * * * *